(12) United States Patent
Brazier et al.

(10) Patent No.: US 7,954,438 B2
(45) Date of Patent: Jun. 7, 2011

(54) WOOD FIRED BOILER

(76) Inventors: Dennis Brazier, Greenbush, MN (US);
Mark J. Reese, Greenbush, MN (US);
Thomas Pittman, Thief River Falls, MN
(US); Benjamin A. Reese, Greenbush,
MN (US)

( * ) Notice: Subject to any disclaimer, the term of this patent is extended or adjusted under 35 U.S.C. 154(b) by 545 days.

(21) Appl. No.: 12/075,530

(22) Filed: Mar. 12, 2008

(65) Prior Publication Data

US 2008/0223266 A1 Sep. 18, 2008

Related U.S. Application Data

(60) Provisional application No. 60/906,897, filed on Mar. 13, 2007.

(51) Int. Cl.
*F23M 9/06* (2006.01)
*F24H 3/10* (2006.01)
*F23N 5/00* (2006.01)

(52) U.S. Cl. ........ 110/203; 110/309; 110/322; 110/234; 110/185; 126/108; 126/110 R

(58) Field of Classification Search ............. 110/173 R, 110/210, 208, 211, 212, 213, 214, 267, 302, 110/303, 305, 306, 308, 309, 310, 317; 126/77, 126/101, 110 R, 108
See application file for complete search history.

(56) References Cited

U.S. PATENT DOCUMENTS

| | | | | | |
|---|---|---|---|---|---|
| 3,543,700 | A | * | 12/1970 | Devita et al. | 110/213 |
| 3,907,210 | A | * | 9/1975 | Dow et al. | 431/165 |
| 4,319,556 | A | * | 3/1982 | Schwartz et al. | 110/203 |
| 4,582,045 | A | * | 4/1986 | Dorau et al. | 110/203 |
| 4,630,553 | A | * | 12/1986 | Goetzman | 110/298 |
| 4,646,712 | A | * | 3/1987 | Ferguson et al. | 110/214 |
| 5,014,680 | A | * | 5/1991 | Siemer | 110/214 |

* cited by examiner

*Primary Examiner* — Kenneth B Rinehart
*Assistant Examiner* — David J Laux
(74) *Attorney, Agent, or Firm* — DL Tschida

(57) ABSTRACT

A bio-mass fueled boiler operating at delivered efficiencies in excess of 90%. Pre-heated, pressurized primary combustion air is supplied to a primary burn chamber via horizontal and vertical orifice containing conduits. Exhaust gases are directed past a reflective secondary burner supplying pre-heated, pressurized secondary combustion air into a secondary burn/ash collection chamber. Exhaust gases are directed from the secondary burn chamber via exhaust conduits having axial and cross-sectional shapes and wall geometries that promote internal turbulence and heat transfer. One or more gas/oil fired burners are fitted to or between the primary and secondary combustion chambers. Several operating modes are provided via associated blowers, air baffles, liquid and gas fuel conduits, pumps and sundry stove sensors and servos coupled to microprocessor control circuitry.

19 Claims, 15 Drawing Sheets

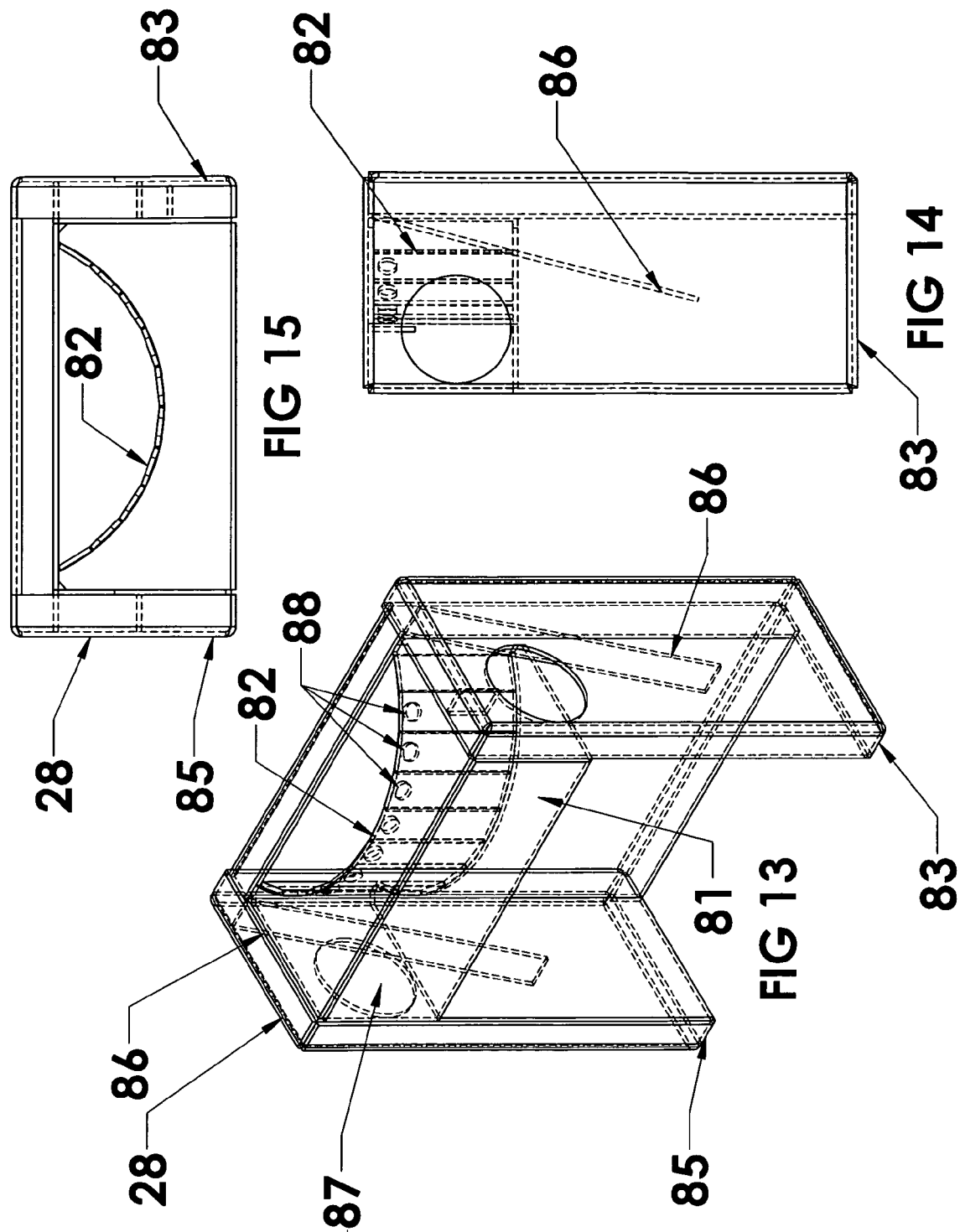

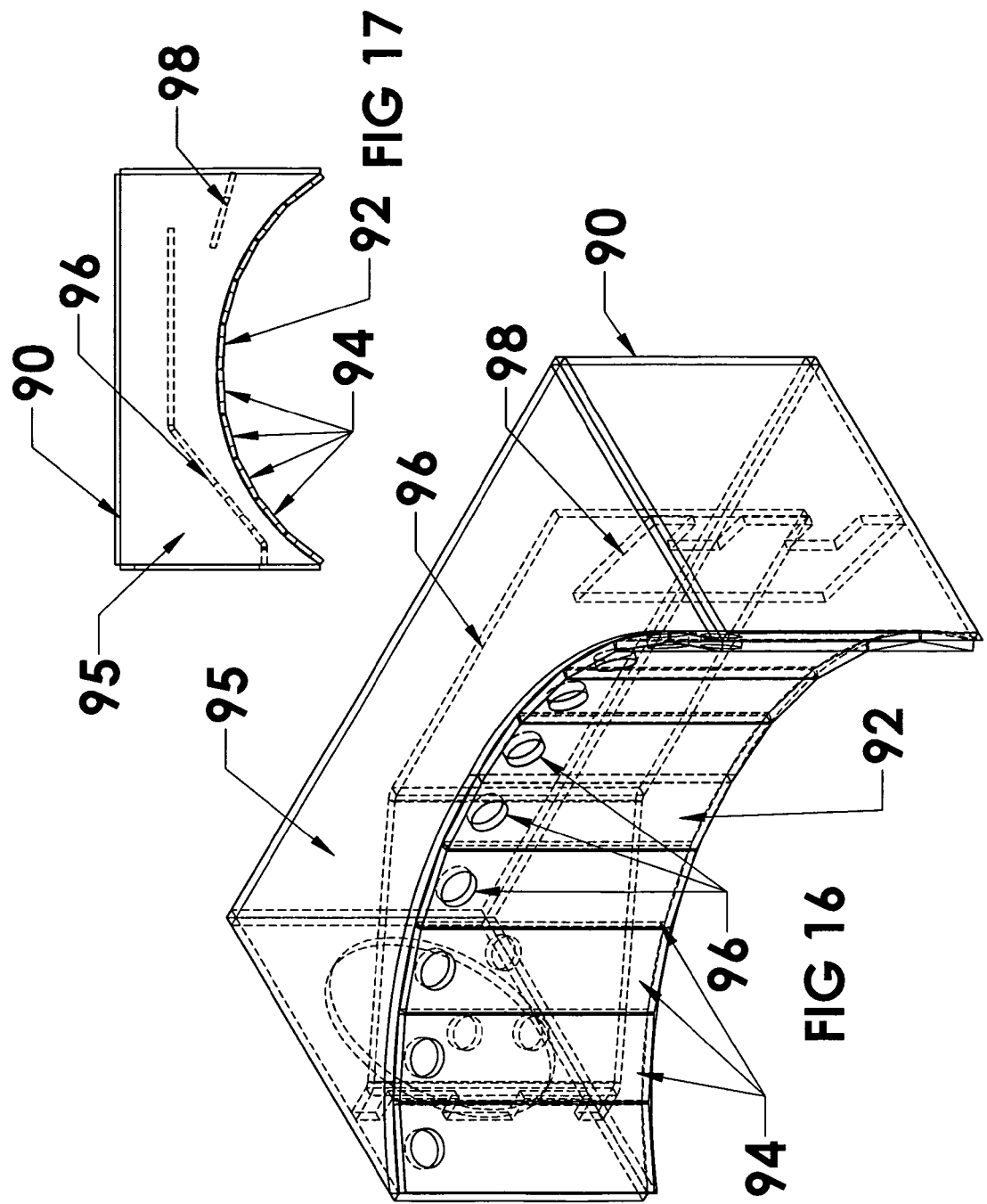

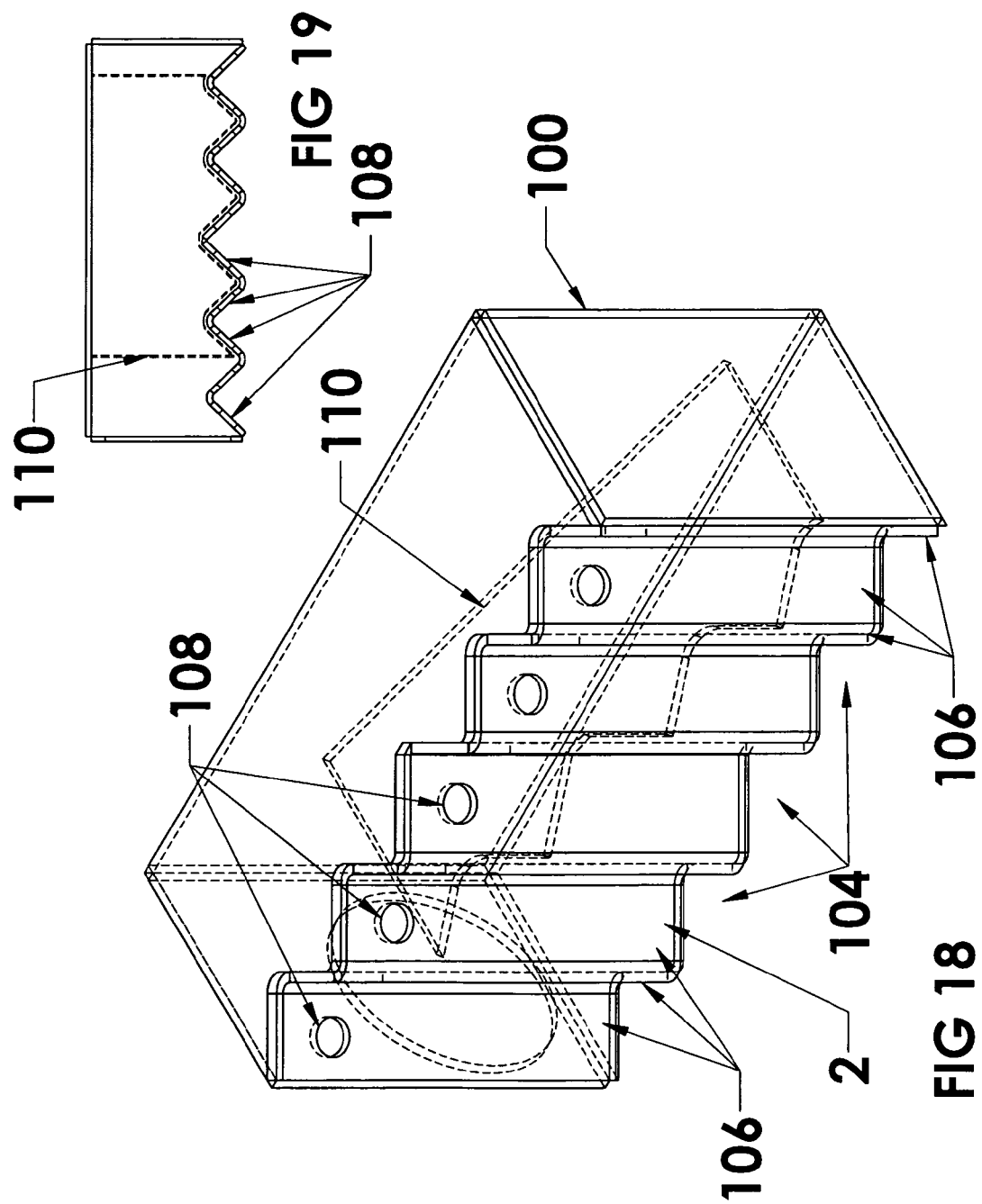

WOOD FIRED BOILER

RELATED APPLICATION DATA

This is a non-provisional application of provisional application Ser. No. 60/906,897, filed Mar. 13, 2007.

BACKGROUND OF THE INVENTION

The present invention relates to biomass fueled stoves and boilers and, in particular, to a high efficiency wood or other biomass fueled stove/boiler wherein multiple combustion chambers and exhaust gas conduits are collectively surrounded by a liquid thermal transfer chamber to capture released heat energy and wherein exhaust gases to repetitively subjected to turbulent, pre-heated, pressurized combustion air to burn off hydrocarbons and other pollutants.

A wide variety of low-pressure wood and alternative biomass fuel (e.g. wood, coal, corn and other seeds, chips, pellets, crop waste etc.) stoves and boilers have been developed for residential and commercial use. Many of the boiler assemblies are constructed as stand-alone, weatherproof assemblies that are remotely located adjacent a heated building. Low pressure liquid supply lines are conducted from the boiler to an insulated, liquid distribution system at the heated facility. The heated facility is thereby isolated from any fire danger and exhaust gases are dispersed to the environment.

Many existing wood fueled stoves and boilers are relatively inefficient and exhaust smoke and flue gases that contain high concentrations of hydrocarbons that are hazardous to the environment. Efforts increasingly have been extended to improve stove/boiler efficiencies to increase thermal capture and reduce carbon emissions.

The present invention and novel biomass fueled stove/boiler was developed to provide a stove/boiler that is compatible with wood, coat, pellets and other biomass materials and is capable of burning the organic biomass fuel materials at efficiencies in excess of 90% with substantially reduced hydrocarbon emissions. The stove/boiler includes refractory lined burn chambers and a surrounding liquid thermal transfer chamber. The thermal transfer chamber and other heated surfaces are covered with sprayed urethane foam insulation to assure optimal heat transfer.

Preheated, pressurized combustion air is supplied to a primary burn chamber via surrounding horizontal and vertical orifice containing conduits. Exhaust gases are substantially directed via positive or negative fan directed pressurization into a lower, secondary burn/ash collection chamber via a secondary burner supplied with preheated, pressurized secondary combustion air. The secondary burner directs pre-heated pressurized combustion air into a shaped combustion space to produce turbulence and enhance combustion of hydrocarbons and pollutants.

The secondary exhaust gases are directed from the secondary burn/ash chamber via several fluted, fire or exhaust tubes that extend at acute angles through the liquid thermal transfer chamber to a further heated mixing chamber before being exhausted from an insulated stove flue. The wall geometry and cross-sectional shape of the fire tubes promote internal turbulence and heat transfer. The tubes can be straight or can include appropriate bends. The shaping and angular extension of the exhaust tubes promotes optimal heat energy collection, hydrocarbon combustion and carbon ash collection.

One or more tertiary fuel burners (e.g. oil or gas (natural or propane)) can be fitted to the primary burn chamber, between the primary and secondary burn chambers or at the secondary burn chamber. The tertiary burners can sustain exhaust gas combustion, facilitate cold starts or operate to adjust for changing fuel supply costs and availability.

An associated stove controller operates and/or responds to a combustion air source, airflow baffles, liquid supply and return pumps, sensors, switches and servos in conjunction with sundry operating sensors to accommodate several operating modes. The sensors monitor relevant operating parameters to optimize safety and burner efficiency and minimize back drafts.

SUMMARY OF THE INVENTION

It is a primary object of the invention to provide a high efficiency biomass fueled heating appliance (e.g. wood fueled boiler or stove).

It is further object of the invention to provide a boiler or stove wherein turbulent, pressurized, pre-heated combustion air is injected from orifices displaced horizontally and vertically about a primary burn chamber.

It is further object of the invention to provide a boiler or stove wherein exhaust gases are exposed to turbulent, pressurized, pre-heated secondary combustion air at a secondary burner and secondary burn chamber and directed to a heated mixing and exhaust chamber.

It is further object of the invention to provide a boiler or stove wherein exhaust gases are directed past a secondary burner having shaped surfaces and orifices from which pre-heated, pressurized secondary combustion air is directed to induce reflections and produce turbulent combustion in a secondary burn chamber.

It is further object of the invention to provide a boiler or stove wherein fan directed positive or negative pressurized primary and secondary air flow is created to direct and expose exhaust gases to pre-heated, turbulent, pressurized primary and secondary combustion air.

It is further object of the invention to provide a boiler or stove wherein a secondary burner directs pre-heated, pressurized secondary combustion air in a reflective space to turbulently mix with and promote exhaust gas combustion.

It is further object of the invention to provide a boiler or stove wherein exhaust gases are directed via angularly aligned exhaust tubes having wall surfaces shaped and directed to produce internal turbulence and that extend at acute angles between internal burn and exhaust chambers to an external flue.

It is further object of the invention to provide a boiler or stove including one or more alternative fuel fired burners to facilitate the reduction of hydrocarbon emissions and/or cold startups and/or adjust operation to fuel costs and availability.

It is further object of the invention to provide a boiler or stove including baffles and air control assemblies to restrict back drafts.

The foregoing objects, advantages and distinctions of the invention are obtained in a presently preferred biomass fueled boiler or stove assembly described below. The boiler/stove provides turbulent, pre-heated, pressurized primary and secondary combustion air to combust a wide variety of biomass mass fuels with high efficiency from optimally located primary and secondary chambers. An insulated, liquid thermal transfer chamber surrounds the primary and secondary burn chambers and captures released heat energy.

The boiler supplies primary combustion air via a injection assembly. Positively pressurized air is admitted to the fire box via horizontal and vertical orifice containing conduits. Exhaust gases are directed via a secondary pressurized burner into a lower, secondary burn/ash collection chamber.

Preheated, pressurized primary combustion air is directed from horizontally and vertically directed outlets at the primary burn chamber. The horizontal conduits are arranged below the vertical center of the primary burn chamber. A substantial portion of the exhaust gases are directed from the primary burn chamber into a lower, secondary burn/ash chamber. Pre-heated, pressurized air is directed from secondary burner orifices to create a turbulent flame front and exhaust gas temperatures on the order of 1220 to 1500° F. to burn the emissions. Combustion of the exhaust gases and unburned hydrocarbons continues in the secondary burn chamber which also collects ash and solid matter. The secondary combustion air is directed from orifices at a secondary burner assembly constructed to produce reflections and turbulent air flow.

The secondary exhaust gases are directed via several fluted fire or exhaust tubes that extend from the secondary chamber through the surrounding insulated thermal transfer chamber. Shaped heat transfer surfaces defined by fluting and convolutions at the fire tubes produce internal turbulence, enhance the heat transfer surface to the liquid thermal transfer media, and maintain exhaust gas temperatures to facilitate optimal hydrocarbon combustion.

The wall geometry and cross-sectional shape of the fire or exhaust tubes are selected to promote internal turbulence and heat transfer without requiring a discrete turbulator assembly. The walls can be configured in a variety of shapes and forms that promote turbulence (e.g. with parallelogram, square, star or other grooves, projections or fluting, V-shaped edges or corners when viewed in cross section) versus round or smooth cross-sectional shapes. The fire tubes can also be straight or include appropriate convolutions, bends, twists and/or turns.

The fire tubes preferably project at an acute angle in the range of 45 to 80 degrees versus conventional fire tubes that typically lay horizontal and/or may wind in a horizontal serpentine path. The angular displacement of the present fire/exhaust tubes facilitates carbon removal from the tubes. That is, gravity directs ash and carbon falling from the tubes back into the secondary burn/ ash chamber where the carbonized ash and solids from the primary burn chamber are continually subjected to secondary combustion.

A tertiary burner can be fitted to the primary burn chamber to facilitate cold starts and/or provide for boiler operation with a secondary fuel (e.g. gas—natural or propane, oil or other petrochemical fuels). A second gas fired burner and pressurized combustion air supply can also be provided at the secondary burn/ash chamber. The tertiary gas fired burner(s) sustains combustion of the exhaust gases during startup and low temperature stove conditions.

Associated stove controls, servos, air baffles and the like supply turbulent, preheated, pressurized combustion air to the primary and secondary burn chambers. Air flow is also controlled to minimize back drafts with the opening of either the primary or secondary burn chamber doors.

An exhaust manifold is coupled to the primary burner and the fire tubes from the secondary burn chamber to control exhaust gas flow to a solenoid controlled damper at the primary flue stack fitted to the back of the stove enclosure. The liquid thermal transfer chamber and any surfaces exposed to the flow of the liquid thermal transfer media are insulated with heat resistant foam.

Rear compartments at the stove enclosure contain liquid supply and return fittings, pump(s), fan(s) and sundry stove sensors, servos, baffles and other controls. Appropriate sensors are provided and coupled to the control circuitry and a microprocessor controller to provide for several operating modes. The sensors and switches monitor several different operating parameters including stack temperature, water temperature, flame conditions, oxygen levels, and door conditions.

Still other objects, advantages, distinctions, constructions and combinations of individual features of the invention will become more apparent from the following description with respect to the appended drawings. The description to each combination should therefore not be literally construed in limitation of the invention. Rather, the invention should be interpreted within the broad scope of the further appended claims.

BRIEF DESCRIPTION OF THE DRAWINGS

The following figures disclose presently preferred constructions of the invention. Similar components and assemblies are referred to in the various drawings with similar alphanumeric reference characters and callouts.

FIG. 13 is a perspective drawing showing the secondary burner assembly and wherein internal baffling is shown in dashed line.

FIG. 14 is a right side plan view to the secondary burner assembly of FIG. 13 and wherein internal baffling is shown in dashed line.

FIG. 15 is a top plan view to the secondary burner assembly of FIG. 13 and wherein internal baffling is shown in dashed line.

FIG. 16 is a perspective drawing showing a first alternative secondary burner assembly and wherein internal baffling is shown in dashed line.

FIG. 17 is a top plan view to the first alternative secondary burner assembly of FIG. 16 with the top wall removed.

FIG. 18 is a perspective drawing showing a second alternative secondary burner assembly and wherein internal baffling is shown in dashed line.

FIG. 19 is a top plan view to the second alternative secondary burner assembly of FIG. 18 with the front wall removed.

DESCRIPTION OF THE PREFERRED EMBODIMENTS

Figure 1:
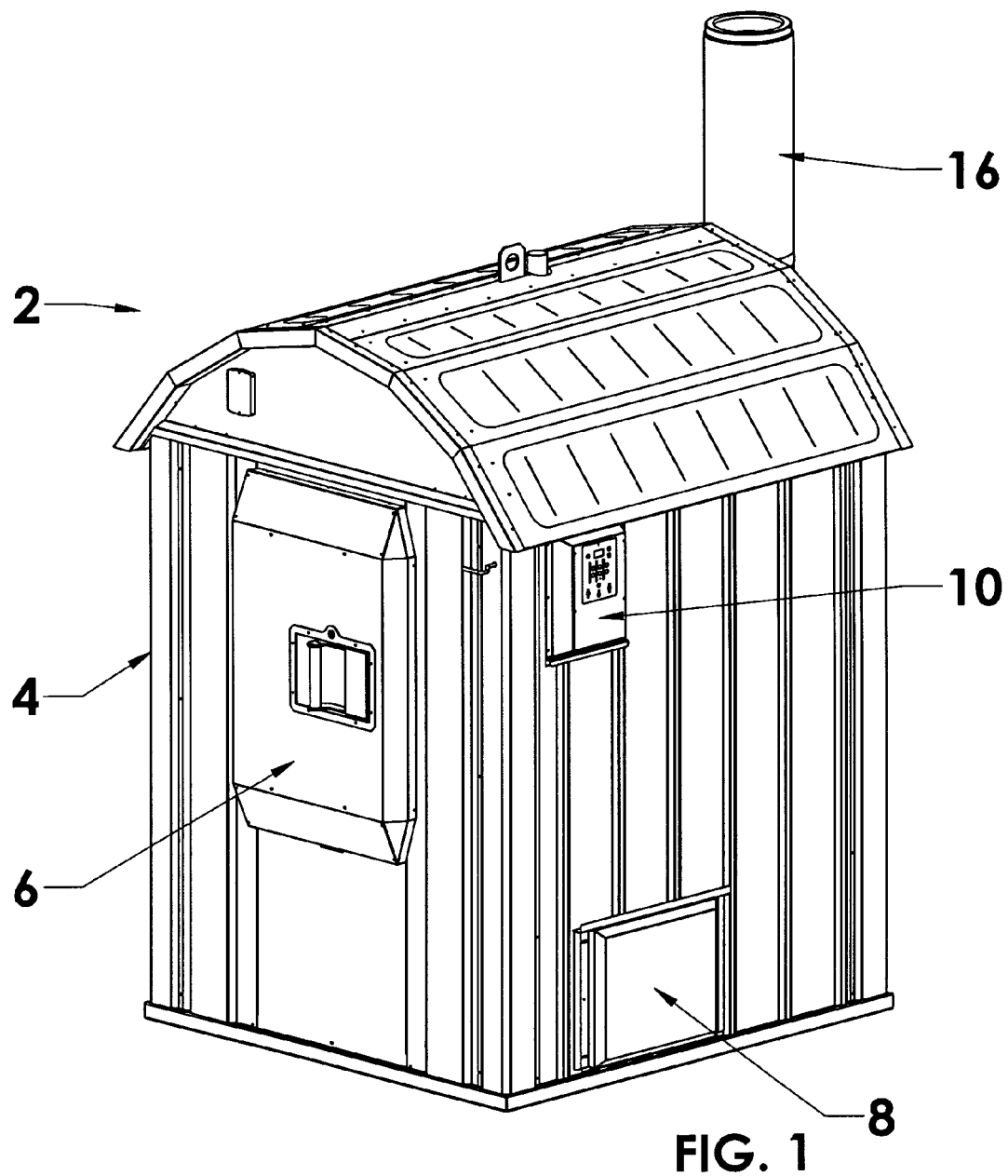
FIG. 1 is a perspective drawing showing external views to the front, right side and top of the boiler/stove.

Referring to FIGS. 1 through 5, several views are shown to the general external and internal construction of the biomass fueled stove and boiler assembly 2 of the invention. The boiler 2 is compatible with wood, coal, manufactured pellets, grains, and waste agricultural materials, among a variety of combustible biomass materials. The boiler 2 provides a formed steel enclosure 4 having a front door 6, an ash removal door 8 and a side-mount operational controller panel 10.

The door 6 is constructed to provide an airtight fit with an enclosed primary burn chamber 12. The primary burn chamber 12, ash chamber and associated exhaust gas flow paths are surrounded by an insulated liquid thermal transfer chamber 14. An upright, insulated exhaust gas flue 16 is supported to the rear surface of the boiler 2.

The primary burn chamber 12 provides a floor 18 and side walls 20 constructed or covered with bricks 22 formed from suitable refractory materials capable of withstanding normal operating temperatures and conditions. Approximately centered in the floor 18 is a port or opening 24 containing several laterally displaced refractory baffles 26 that open to an underlying secondary burner 28 and lower lying secondary burn chamber and ash collection chamber 30. The assembly 28 is loosely referred to as a "burner" for convenience only since it conducts secondary combustion air and does not operate as a fueled burner.

Internal air pressures induce combustion exhaust gases to substantially flow into the secondary burner 28. A fan assisted, positively pressurized boiler 2 is presently provided, although a negatively pressurized boiler 2 could also be constructed. A portion of the combustion exhaust gases and smoke are drawn off the top of the primary burn chamber 12 where the gases are directed to the flue 6 via a primary exhaust conduit 32, reference FIG. 5. Gases flow through the conduit 32 principally when the door(s) 6 and/or 8 are opened. The relative pressures within the primary and secondary burn chambers 12 and 30 adjust with the door opening to direct the gases through the conduit 32 instead of as a back draft at either of the door(s) 6 and/or 8. The heat and turbulent air flow within the primary burn chamber 12 assures that hydrocarbons contained in the gases at the top of the burn chamber 12 are optimally incinerated prior to being directed via the port 32 to an exhaust gas manifold or mixing chamber 34 mounted to the rear wall of the burn chamber 12.

Baffles can be included at the conduit 32 to further facilitate back draft control. Similarly and although not depicted, additional provisions can be made at the secondary burn chamber 30 and/or door 8 and/or boiler controls to prevent back drafts from the secondary burn chamber 30 upon opening the ash door 8.

During normal operation, the bulk of the exhaust gases are directed downward past the secondary burner 28 and into the secondary burn and ash chamber 30. Ash or solid waste combustion byproducts are removed from the ash chamber 30 via the door 8. The exhaust gases are directed from the secondary burn chamber 30 via several fluted and/or convoluted fire or exhaust tubes 36. The bores or inner diameters of the tubes 36 are shown in cutaway at FIG. 2. The tubes 36 extend in side-by-side parallel relation to each other at an acute angle from the secondary burn chamber 30 to the exhaust gas manifold or mixing chamber 34.

The exhaust gases from the primary and secondary burn chambers 12 and 30 are collected at the manifold 34 and directed past a controlled baffle or damper 38 to the flue 6. A laterally directed linkage arm assembly 40 is mounted to pivot and control the damper 38. The exhaust gas volume is controlled in relation to monitored operating temperatures to provide optimum burning of hydrocarbons and other pollutant materials. Delivered operating efficiencies at industry "high heating value" (HHV) and "low heating value (LHV) ratings have been obtained in the ranges of 60% to 80% HHV and 65% to 90% LHV. Collectively, general delivered efficiencies have been measured in the range of 60% to 91% for the stove/boiler 2.

FIGS. 6 through 12 depict additional details to the construction of the exhaust manifold 34 and several other air control and tertiary burner assemblies described below. Removable panels 42, 44 and 46 are mounted to the framework of the housing 4 at a rear wall 48 and permit access to the various burners, fans, pumps, baffles, servos, plumbing fittings and the like used to operate the stove/boiler 2. A further cover 50 permits access to the primary flue 6 for inspection and cleaning.

The stove/boiler 2 is designed to operate with biomass fuels, however, a tertiary, gas or oil fired burner 52, such as disclosed at U.S. Pat. No. 6,718,889, is fitted to a conduit 54 at a rear wall of the primary burn chamber 12. The tertiary burner 52 is principally operated during cold starts until the stove 2 reaches operating temperatures. Alternatively, the burner 52 can be used as a primary heat source when wood or other biomass materials are unavailable or too costly or during periods when operating personnel aren't available to tend the stove/boiler 2.

The 80% plus operating efficiencies of the stove/boiler 2 are obtained in part by injecting pressurized air into the primary and secondary burn chambers 12 and 30 and at the exhaust fire tubes 36. Preheated, pressurized combustion air is injected into the primary burn chamber 12 via a hollow conduit assembly 60 that substantially circumscribes the primary burn chamber 12 and through which the conduit 54 passes. The assembly 60 includes horizontal segments 62 that circumscribe the rear and side walls of the primary burn chamber 12. The horizontal segments 62 are located at or below the vertical height of the primary burn chamber 12 to maintain the combustion air near the primary combustion zone for the particular combustion material. Primary combustion typically occurs in the lower third of a pile of combustible material or near the ash pile.

Vertical segments 64 extend from the ends of the segments 62 and project parallel to the sides of the door 6. The assembly 60 is thus located slightly above the refractory floor 18 and below the midway point of the primary burn chamber 12 to promote combustion.

Orifices 66 displaced along the segments 62 and 64 dispense pressurized combustion air conducted through the conduit assembly 60 into the primary burn chamber 12. The pressurized combustion air mixes with the combustion gases and smoke to produce turbulence and enhance the burning of hydrocarbons. The size and location of the orifices 66 are selected to optimize fuel combustion within the chamber 12. The primary combustion air admitted to the stove/boiler 2 exhibits a nominal positive pressure in the range of 0.1 to 1 inch of water column (WC) within the primary burn chamber 12. The positive pressure is obtained with primary and secondary combustion air fan assist assemblies discussed below. It is to be appreciated negatively pressurized stove/boiler 2 could be constructed to draw primary and secondary combustion air and exhaust gases through the assembly 2 with fan or other airflow assist assemblies.

The pressurized air is supplied from an air manifold or plenum 66 mounted to the rear wall of the thermal transfer chamber 14. The chamber 14 is fed by a fan 68, reference FIGS. 8 through 11. Air is directed from the plenum 66 into a conduit 70 that extends to the primary combustion air conduit assembly 60. An intermediate solenoid operated baffle 72 controls air flow into the conduit 70. Another conduit 74 and solenoid controlled baffle 72 direct pressurized combustion air into the secondary burner 28. A further conduit 76 and solenoid controlled baffle 72 direct pressurized combustion air into the secondary burn chamber 30. The conduit 76 can also cooperate with a gas or liquid fired burner (e.g. propane or natural gas or oil) similar to the burner 52 to support and enhance combustion in the secondary burn chamber 30. Microprocessor control circuitry at the controller 10 determines appropriate timing signals to control the on/off duty cycling of the baffles 72 and gas/oil fired burners 52.

Turning attention to FIGS. 4, 6, 8, and 12 through 15, the ash port 24 is located at the approximate center of the refractory floor 18. The baffles 26 segregate the port 24 to receive and direct combustion gases and smoke into the secondary burn chamber 30. Upon pressurizing the primary chamber 12 via the primary combustion air conduit assembly 60, a substantial portion of the combustion exhaust gases and smoke are directed past the secondary burner 28 and into the secondary burn chamber 30. The exhaust gases pass through an arcuate vertical channel 80 defined by an arcuate (e.g. semi-circular) front wall 82 of the secondary burner 28 and a rear wall 84 of the secondary burn chamber 30.

Pressurized and preheated secondary combustion air is conducted via conduit 74 to the side wall of the secondary burner 28 and into a cavity 81 behind front wall 82. A portion of the pressurized air is diverted into right and left wing chambers 83 and 85 that depend from the sides of the burner 28 into the secondary burn chamber 30. Internal baffles 86 at the wing chambers 83 and 85 divert a portion of the secondary combustion air into the depending portions of the wing chambers 83 and 85.

The disruption and partial bleeding of air flow into the wing chambers 83 and 85 induces turbulence in the cavity 81 and wing chambers 83 and 85. The turbulence and re-direction of air produces a delay in the air flow before the air is ejected from orifices 88 arranged over the arcuate burner wall 82. The delay facilitates the preheating of the secondary combustion air from the conduit 74 in the cavity 81 before being ejected into the channel 80 and secondary burn chamber 30, reference FIGS. 13, 14 and 15. Thermal energy is also transferred to the depending portions of the wing chambers 83 and 85 that extend into the secondary burn chamber 30 to maintain combustion of hydro carbons in the exhaust gases in the secondary burn chamber 30.

The secondary combustion air directed from the orifices 88 strikes and reflects the exhaust gases in the channel 80 between the walls 82 and 84. The resulting mixing and turbulent flow optimizes the ignition and combustion of hydrocarbons and other combustibles in the exhaust gases that flow through the channel 80 and into the secondary burn/ash chamber 30.

FIGS. 16 and 17 depict a first alternative secondary burner 90. The burner 90 provides an arcuate front wall 92 that also directs preheated pressurized secondary combustion air into exhaust gases directed into the channel 80 and secondary burn chamber 30. The wall 92 provides several panels 94 that each contain an orifice 96. The panels 94 are arranged to form a semi-circular arc of suitable radius. Secondary combustion air admitted into an interior cavity 95 of the burner 90 via the conduit 74 is delayed by baffles 96 and 98 with a consequent heating of the air before being ejected from the orifices 96.

The mixing of the secondary combustion air with the exhaust gases in the channel 80 again produces reflections and consequent turbulent flow between the faces of the panels 94 and the rear wall 82 of the burn/ash chamber 30. Like the burner 28, the burner 90 thus produces turbulent flow that optimizes the combustion of hydrocarbons and other combustibles in the gases.

FIGS. 18 and 19 depict a second alternative secondary burner 100. The burner 100 provides a semi-circular, corrugated front wall 102 that also directs preheated pressurized secondary combustion air into exhaust gases directed into the channel 80 into the secondary burn chamber 30. The wall 102 provides several grooved recesses 94 defined by opposed wall panels 106 that each contain an orifice 108. The panels 106 generally project at 90° to each other. Secondary combustion air admitted to the interior of the burner 100 is delayed by a baffle 110 before being ejected from the orifices 108. The mixing of the combustion air with the exhaust gases passing through the channel 80 produces reflections between the rear wall 80 and between adjacent faces of the panels 102. Like the secondary burners 28 and 90, the secondary burner 100 produces turbulent flow that optimizes the combustion of hydrocarbons and other combustibles in the exhaust gases admitted to the secondary burn/ash chamber 30. It is to be appreciated still other secondary burner configurations can be constructed to induce turbulence in the exhaust gases.

Combustion continues in the secondary burn/ash chamber 30 upon subjecting the exhaust gases to additional pressurized and heated air supplied from the conduit 76. A fuel fired burner (e.g. propane or natural gas or oil) like the burner 52 can be fitted to the conduit 76 to sustain and enhance combustion in the secondary burn chamber 30. The secondary burn/ash chamber 30 is also lined with refractory materials to maintain secondary burn temperatures.

As combustion of the exhaust gases continues in the secondary burn chamber 30, the gases are directed to the several fluted fire or exhaust tubes 36. The tubes 36 extend at an acute angle between the secondary burn chamber 30 and the exhaust manifold 34 mounted to rear wall of the thermal transfer chamber 14. The tubes 36 are spaced apart from and extend parallel to each other. The tubes 36 extend through the thermal transfer chamber 14 and the liquid flows around each tube 36. The number and spacing between the tubes 36 is selected to facilitate heat transfer from the heated exhaust gases to the liquid media contained in the thermal transfer chamber 14. The tubes 36 project from the secondary burn chamber 30 at an acute angle in the range of 40 to 70 degrees.

The walls of the tubes 36 are shaped and formed to delay and promote turbulent flow through the fire tubes 36. The prolonged, turbulent flow enhances the burning of hydrocarbons contained in the exhaust gases, heat transfer and ultimately enhances efficiency of the stove/boiler 2.

Figure 2:
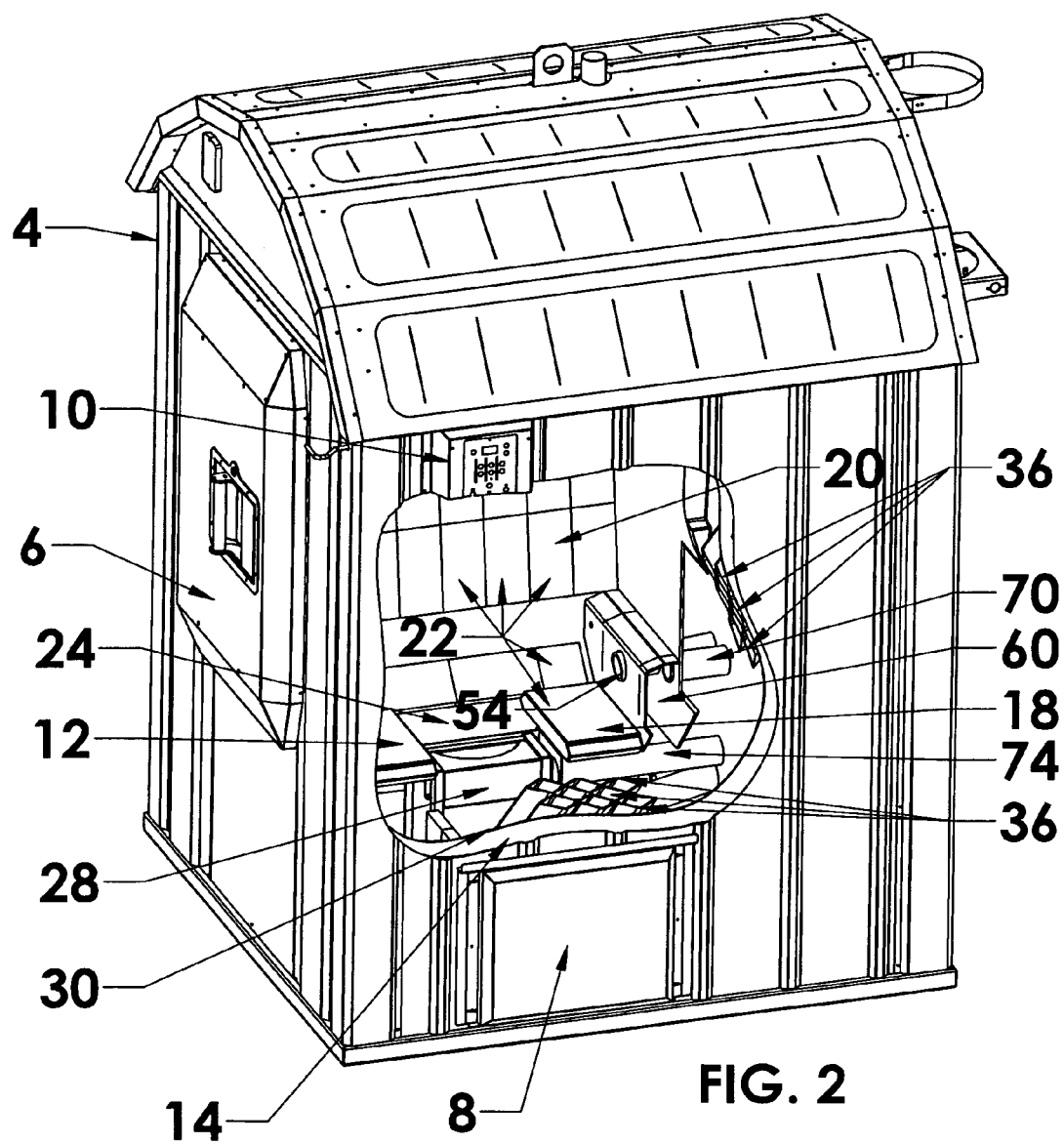
FIG. 2 is a perspective drawing showing the boiler/stove in partial cutaway to expose the primary and secondary burn chambers and exhaust fire tubes.
Figure 3:
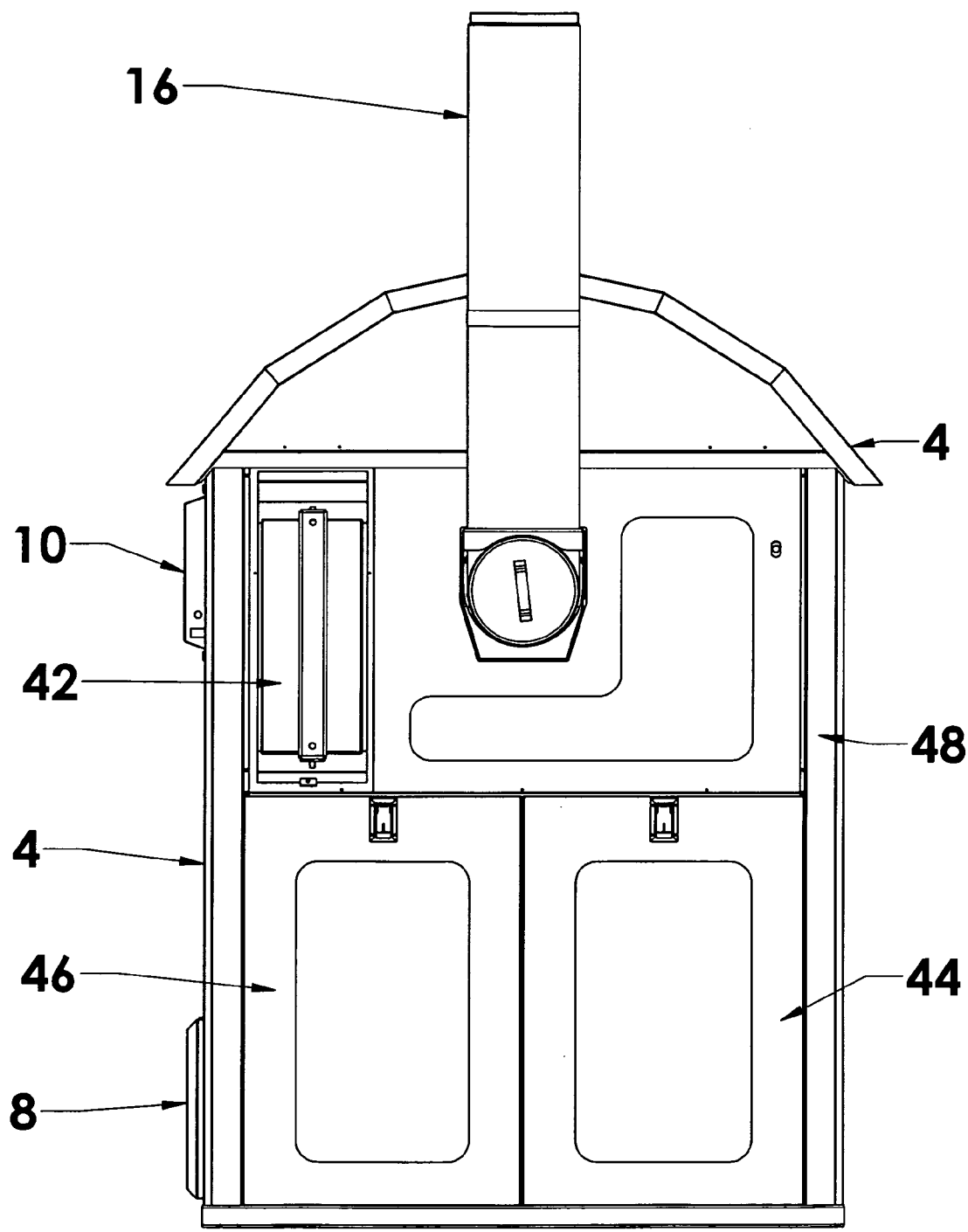
FIG. 3 is a plan view to the rear wall of the boiler/stove.
Figure 4:
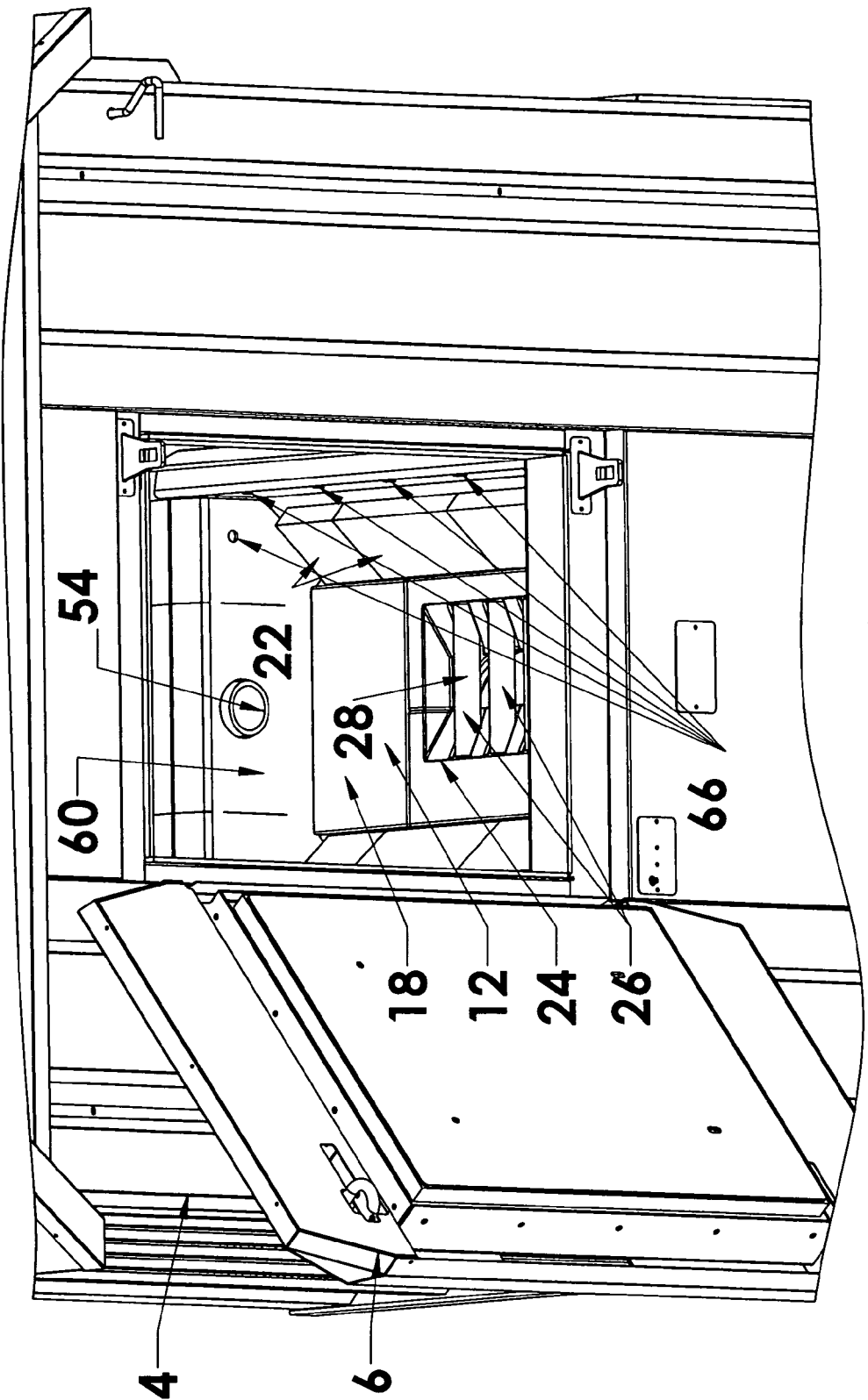
FIG. 4 is a perspective drawing showing with the primary door open and exposing the primary burn chamber and upper region of the secondary burner.
Figure 5:
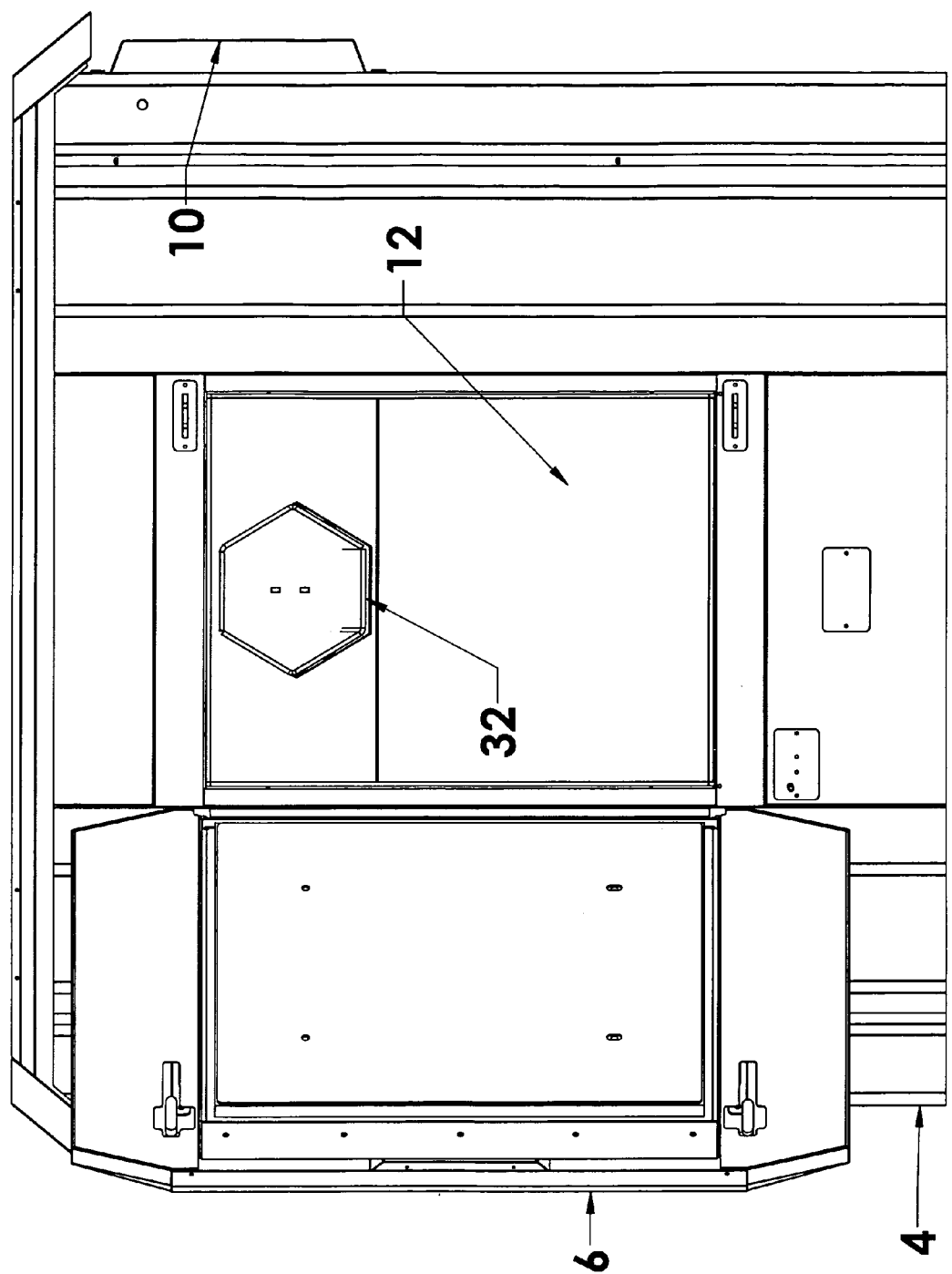
FIG. 5 is a plan view to the front wall of the boiler/stove with the primary door open and exposing the upper region of the primary burn chamber.
Figure 6:
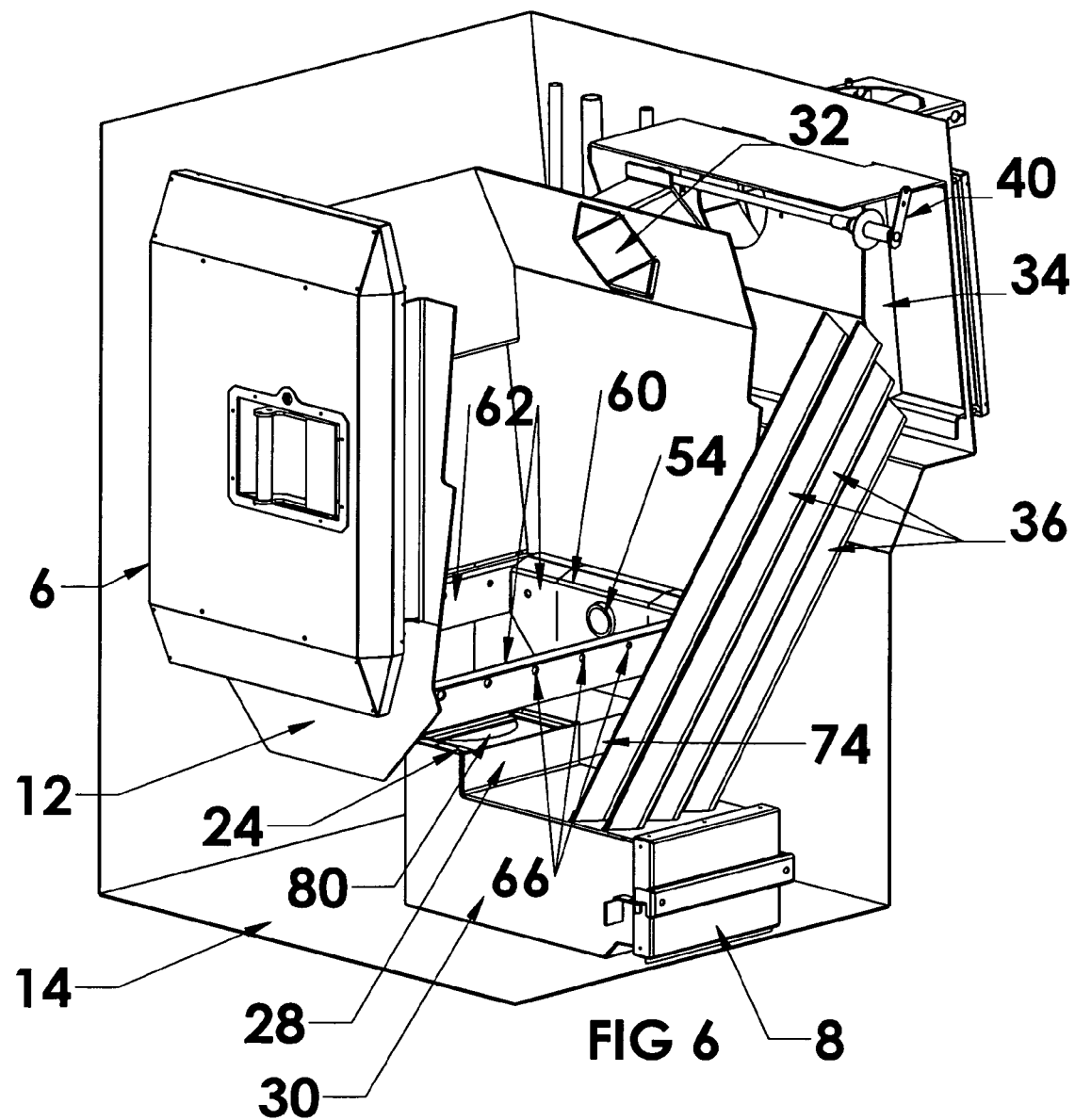
FIG. 6 is a perspective drawing showing the boiler/stove in partial cutaway to expose the liquid thermal transfer chamber, primary burn chamber without the refractory lining, the secondary burn chamber, and the exhaust fire tubes.
Figure 7:
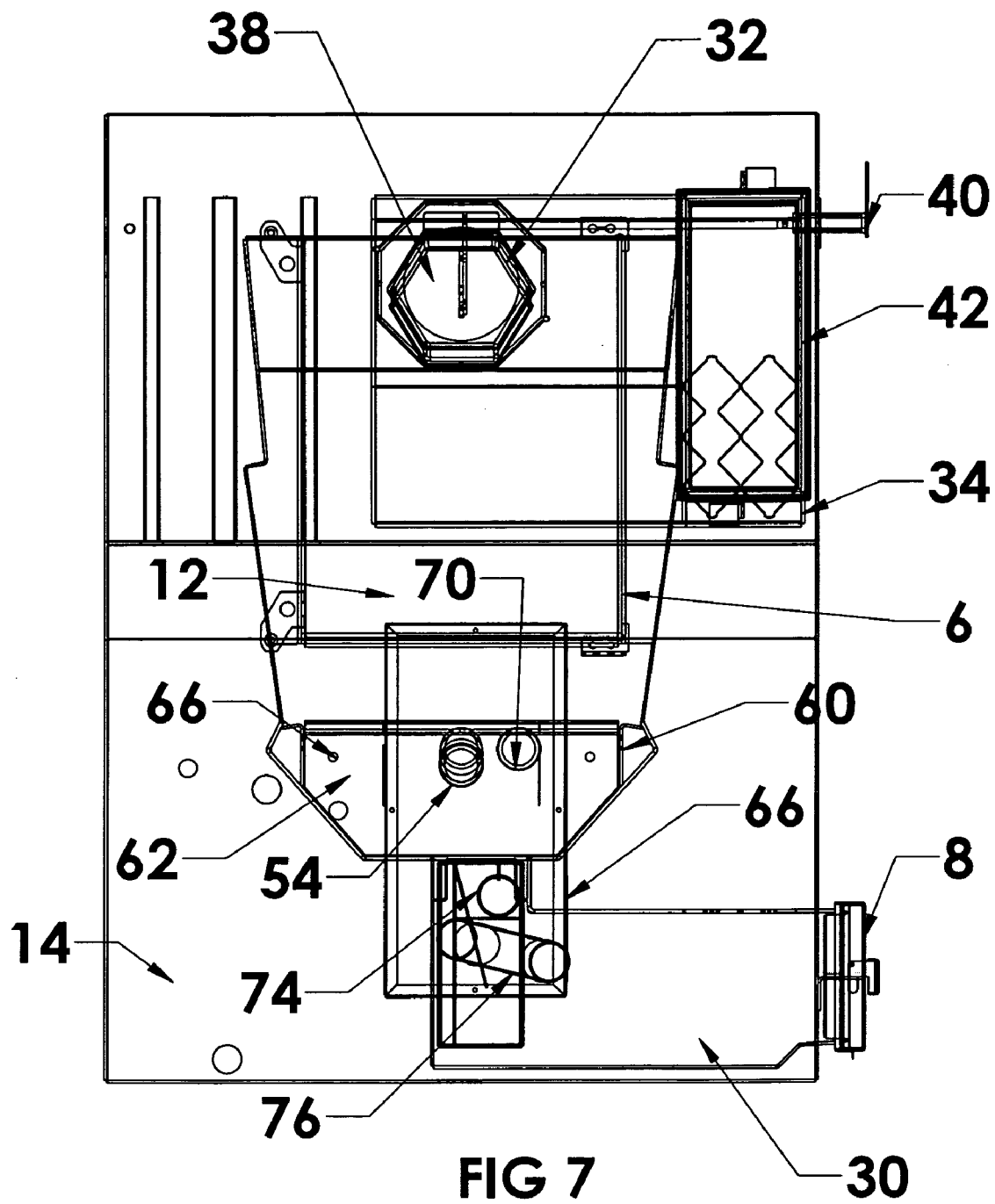
FIG. 7 is a plan view to the front of the boiler/stove with portions of the interior structure shown in dashed line.
Figure 8:
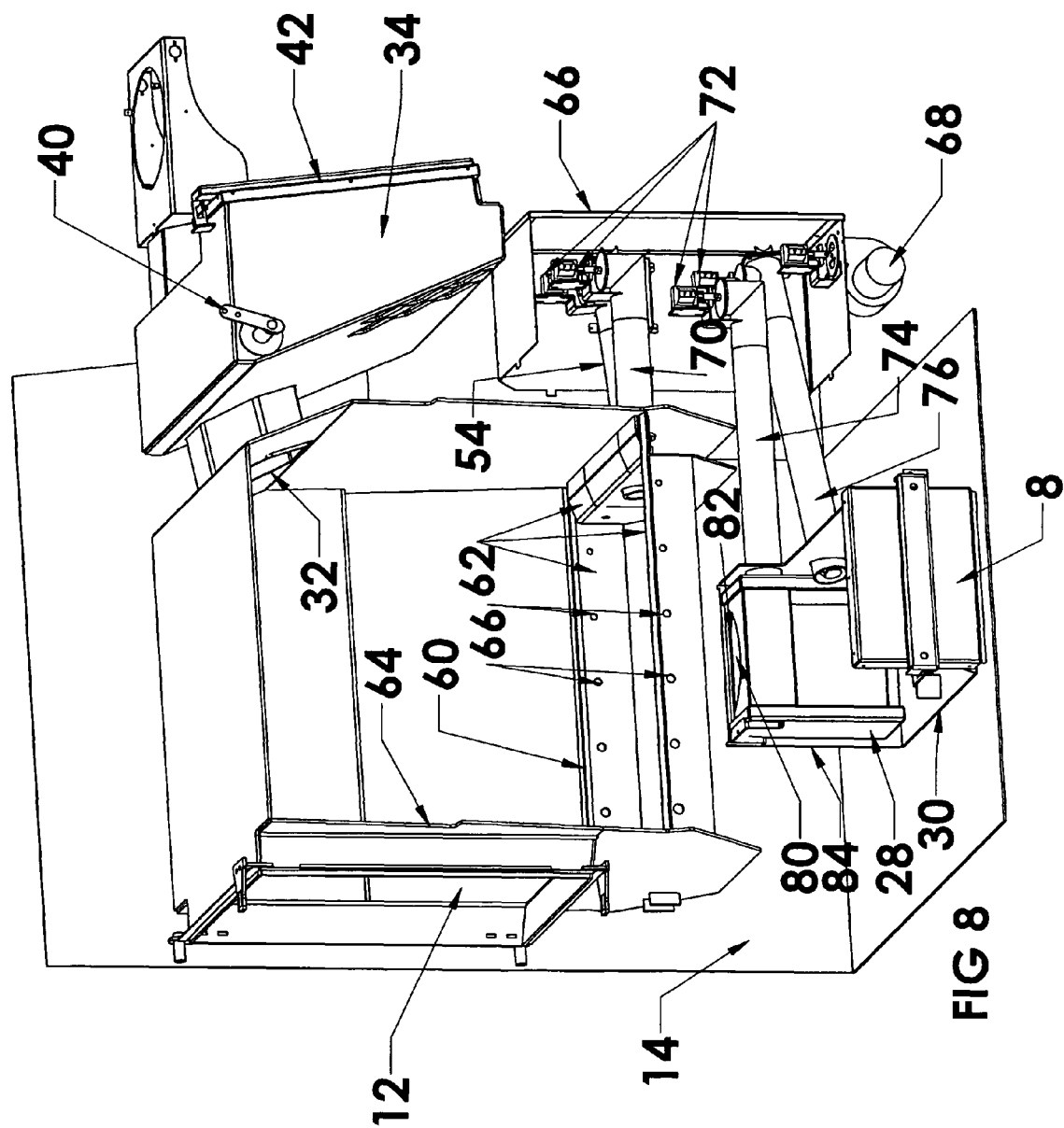
FIG. 8 is a perspective drawing showing the right side of the boiler/stove with several of the thermal transfer chamber and primary and secondary burn chamber walls removed.
Figure 9:
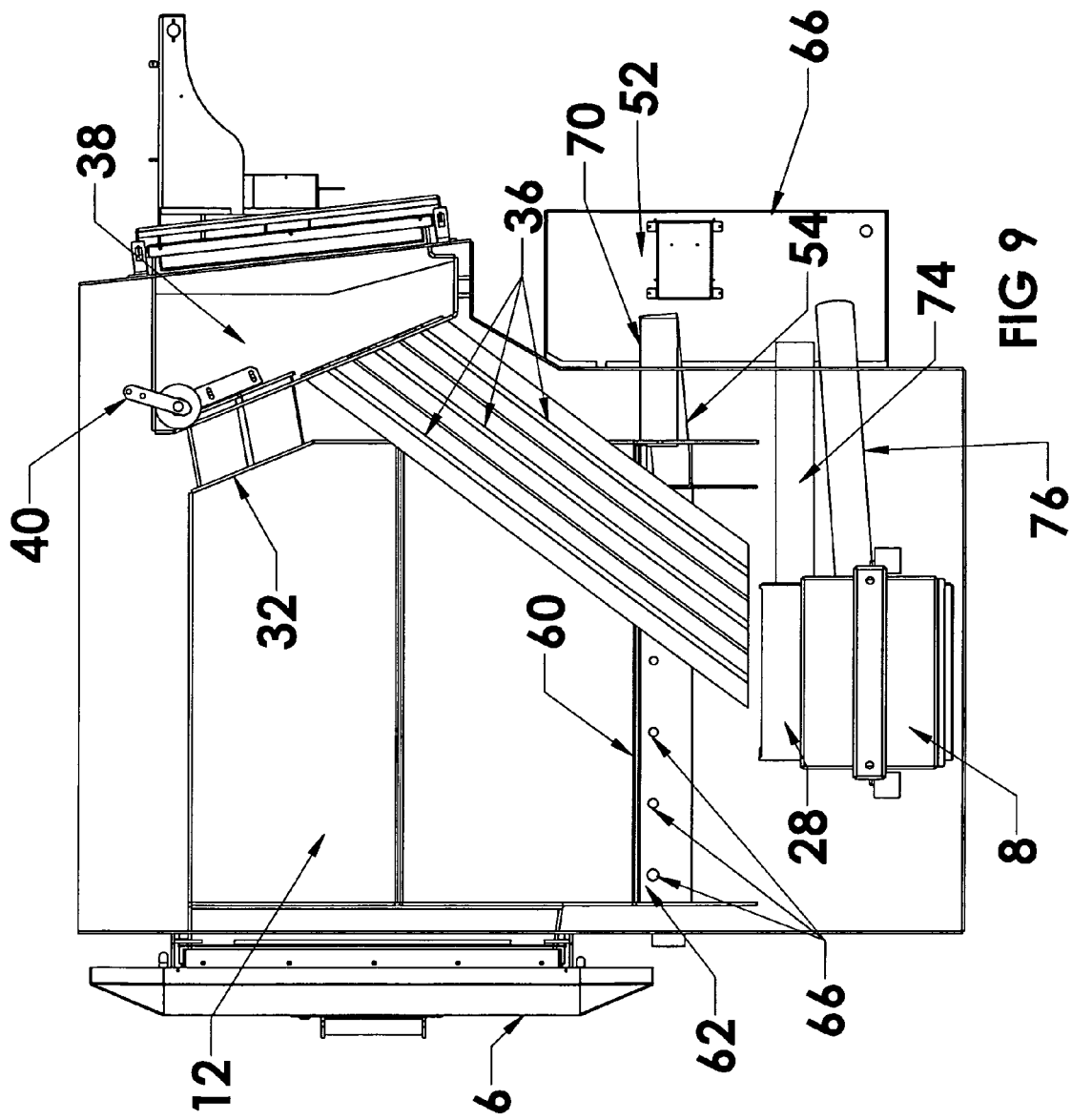
FIG. 9 is a plan view to the right side of the boiler/stove with portions of the interior structure shown in dashed line.
Figure 10:
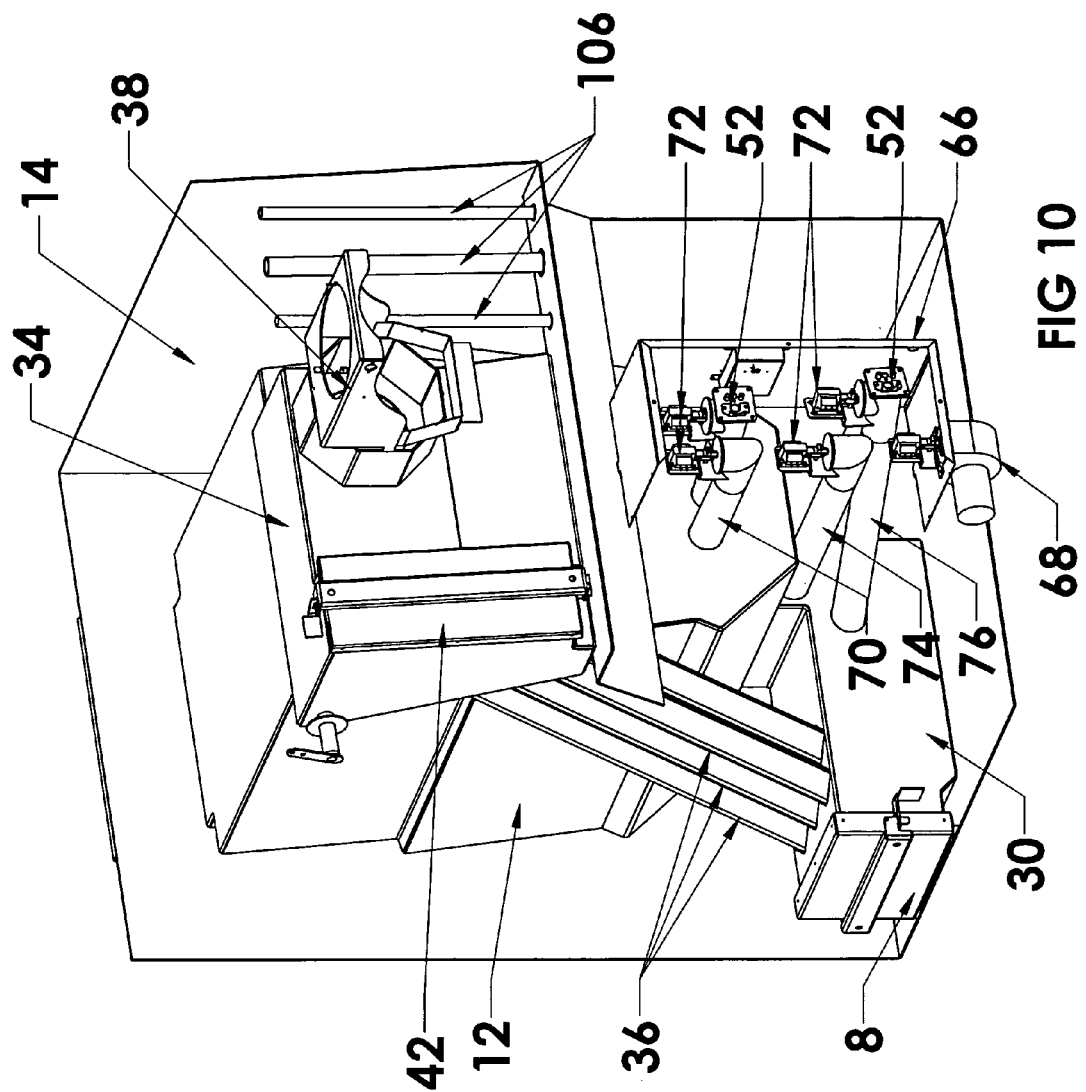
FIG. 10 is a perspective drawing showing the rear and right side views of the boiler/stove with several of the thermal transfer chamber and air supply chamber walls removed.
Figure 11:
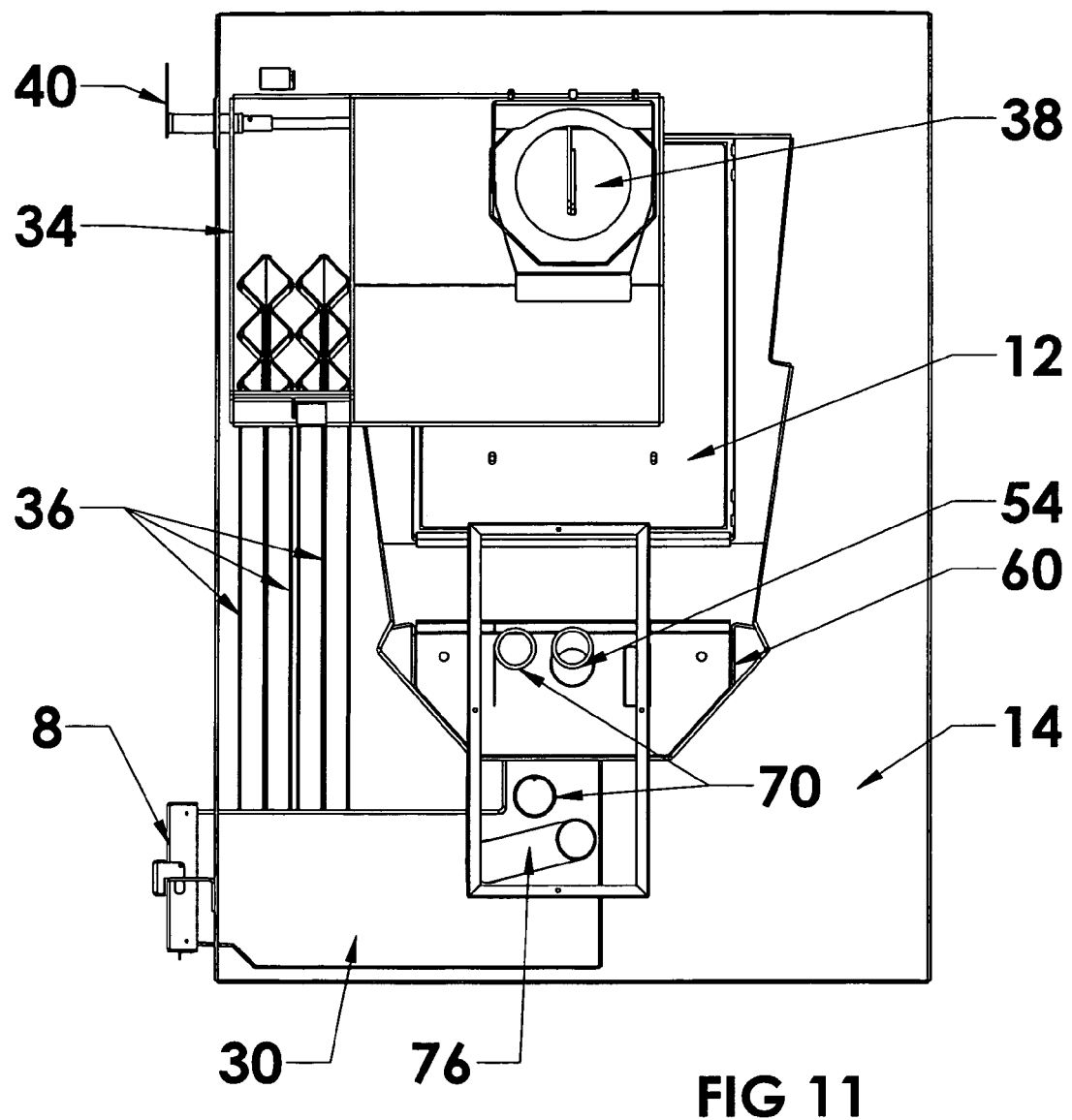
FIG. 11 is a plan view to the rear of the boiler/stove with the rear thermal transfer chamber wall removed and covers to the air supply and exhaust chambers removed.
Figure 12:
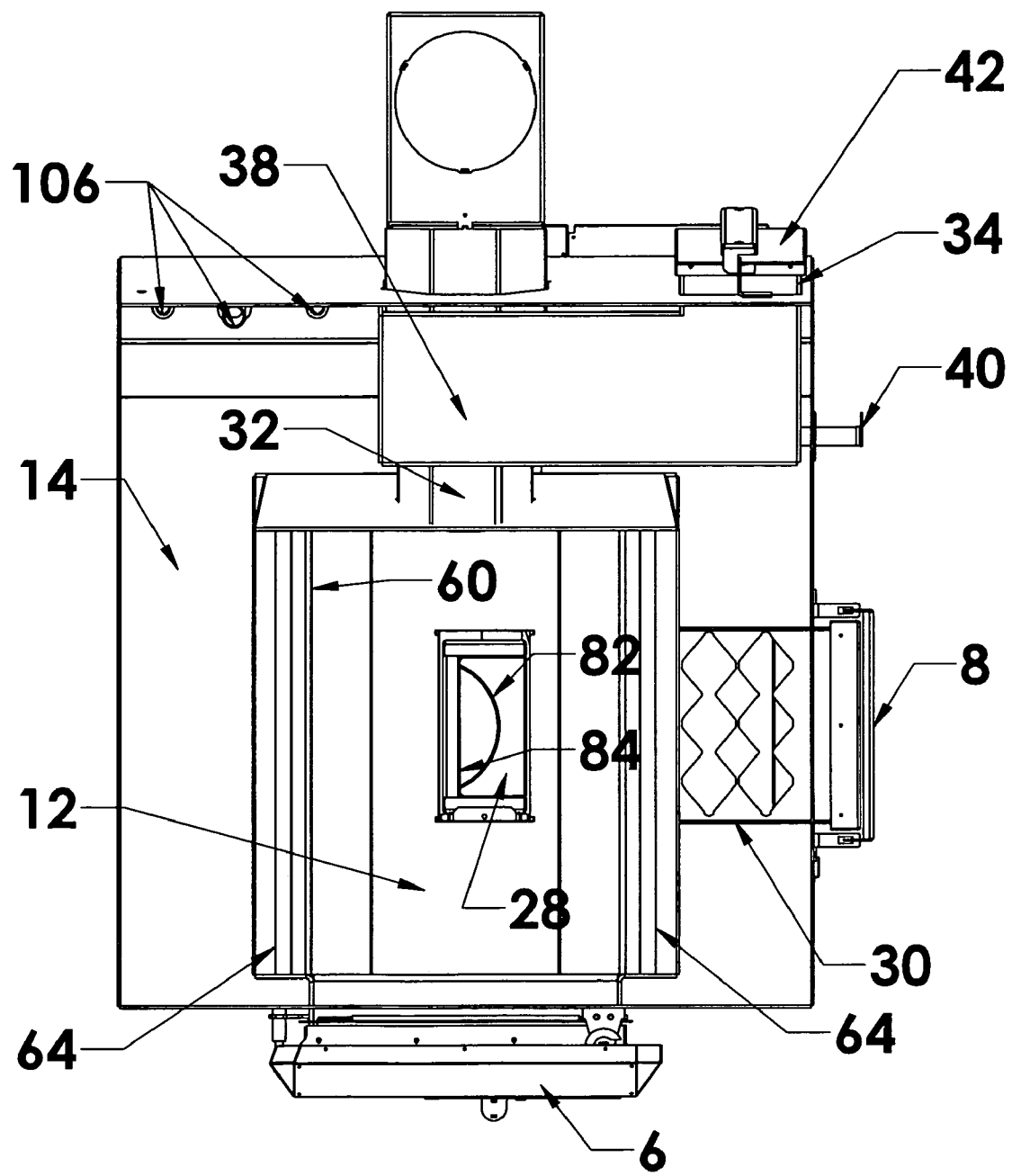
FIG. 12 is a plan view to the top of the boiler/stove with portions of the underlying interior structure shown in dashed line.

The walls of the exhaust/fire tubes 36 presently define bores that exhibit a parallelogram shaped, transverse cross-sectional profile, see the cutaway of the exhaust/fire tubes 36 at FIG. 2 and the exposed ends at FIGS. 7, 8, 11 and 12. The wall geometry and transverse and longitudinal cross-sectional shapes of the exhaust/fire tubes 36 can be varied as desired to promote internal turbulence and heat transfer without requiring the mounting of a discrete turbulator assembly along the path of the exhaust gases. For example, the walls can be configured to define in a variety of cross-sectional bore shapes and forms such as the depicted parallelogram shape or with square, star or other straight or curved wall section shapes. The tube walls may also be formed with grooves, fluting, projections, obstructions and/or V-shaped edges or corners. The wall surfaces can also be varied and/or interrupted with changed shapes or bends along their lengths. The fire tubes 36 can be formed straight as depicted or can include appropriate bends, twists and/or turns. Any ultimate tube shape and/or combination is desirably constructed to promote turbulence in the exhaust gases versus smooth cross-sectional shapes.

The acute, angular alignment of the exhaust or fire tubes 36 is arranged to direct carbon deposits that flake from the walls of the exhaust tubes 36 back into the secondary burn/ash chamber 30. Carbon deposits in the tubes 36 can also be manually cleaned upon opening the access panel 42 at the exhaust manifold 34. As the tubes 36 and carbon deposits are scraped or brushed from the interior walls of the tubes 36, the deposits fall into the ash chamber 30 and are removed via the door 8. The continual exposure of the combustible solid materials in the secondary burn chamber 30 and placement of the secondary burn chamber 30 in the thermal transfer chamber 14, assures that essentially all combustible materials are burned and the released heat energy is captured.

As mentioned, the space behind the rear covers 44 and 46 and in front of the insulation that covers the rear wall of the thermal transfer chamber 14 contains liquid supply and return fittings, liquid conduits 106, a liquid pump, fan blower 68, baffles 72, gas/oil burners 52, flame sensors, thermostat sensors, and sundry other stove servos, sensors and controls. The control devices communicate with programmed microprocessor circuitry at the controller 10 and variously supply and receive control signals. The sensors and switches monitor among different operating parameters, stack temperature, water temperature, flame conditions, oxygen levels, and door conditions.

The microprocessor is programmed to control several general modes of operation. A "cold start" mode operates to supply gas to the tertiary gas/oil burner(s) 52 to provide heat to ignite the biomass pile. The tertiary burner(s) 52 are subsequently operated to optimize combustion efficiencies or during a "backup" mode if the stove temperature falls due to fuel depletion.

Once ignited and during a "run mode", the biomass burns and the stove/boiler 2 is controlled to maintain a thermostatically set temperature and appropriately direct combustion air flow via the blower 68 and baffles 72. During the run mode the duty cycle or on/off times of the baffles 72 are appropriately controlled to maintain optimal burn conditions.

While the invention is shown and described with respect to a presently preferred stove/boiler assembly and several considered improvements, modifications and/or alternatives thereto, still other assemblies and arrangements may be suggested to those skilled in the art. It is also to be appreciated that the foregoing singular and/or combinational features of the stove/boiler can be arranged in different combinations. The foregoing description should therefore be construed to include all those embodiments within the spirit and scope of the following claims.

What is claimed is:

1. A boiler comprising:
   a) an enclosure having a door and defining a primary burn chamber adapted to receive a combustible biomass material and coupled to an exhaust gas port open to the environment;
   b) a plurality of conduits arrayed inside said primary burn chamber and having orifices exposed to the interior of said primary burn chamber;
   c) a secondary burn chamber coupled to receive exhaust gases from said primary burn chamber;
   d) a secondary combustion air conduit mounted between said primary and secondary burn chambers having an arcuate surface aligned opposite walls of the secondary burn chamber, containing a plurality of orifices and including a cavity space containing baffles for diverting and delaying airflow through said cavity space and said orifices;
   e) a plurality of tubular exhaust gas conduits coupled intermediate said secondary burn chamber and said exhaust gas port and having bores formed to produce turbulence in exhaust gases conducted therethrough;
   f) a source of combustion air coupled to said plurality of conduits at said primary burn chamber and the cavity space of said secondary combustion air conduit and controlled to 1) direct air through the conduit orifices to positively pressurize the primary burn chamber and direct combustion exhaust gases containing hydrocarbons past said secondary combustion air conduit and 2) direct air from the secondary combustion air conduit orifices to produce a turbulent and air and exhaust gas mixture and combustion of the exhaust gases prior to entering the secondary burn chamber;
   g) a heat exchanger having an enclosure surrounding said primary and secondary burn chambers, said secondary combustion air conduit and said plurality of exhaust gas conduits and containing a liquid heat exchange media and means for circulating said liquid media through said enclosure; and
   h) means for controlling the flow of exhaust gases from said primary burn chamber and secondary burn chambers and exhaust conduits and through said exhaust gas port.

2. A boiler as set forth in claim 1 wherein said secondary burn chamber comprises an ash collection chamber surrounded by said heat exchange enclosure, wherein said secondary burner underlies ash ports mounted beneath a pile of said biomass materials, and wherein a portion of the cavity space of said secondary combustion air conduit extends into a lower lying portion of said ash chamber such that the secondary combustion air is preheated before being injected by the orifices of the secondary burner into the stream of exhaust gases.

3. A boiler as set forth in claim 1 wherein the orifices of said secondary combustion air conduit are exposed through a corrugated arcuate surface aligned opposite walls of the secondary burn chamber to reflect the pressurized combustion air and exhaust gases injected into to the secondary combustion air conduit between the corrugations and secondary burn chamber walls to induce turbulence into the mixture flow of exhaust gases and combustion air prior to entering the secondary burn chamber.

4. A boiler as set forth in claim 1 wherein a first portion of the conduits in said primary burner are horizontally arrayed about the circumferential walls of said primary burner adjacent to an the upper region of biomass fuel materials burned in said primary burn chamber and wherein a second portion of the conduits extend vertically parallel to lateral sides of a door opening to produce turbulence in the released exhaust gases and direct the exhaust gases downward to said secondary burn chamber when the door is closed and direct the exhaust gases to said exhaust port when said door is open.

5. A boiler as set forth in claim 1 including a burner coupled to said source of combustion air and fueled by a gas or liquid fuel and mounted to said primary burn chamber to initiate combustion of said biomass materials and exhaust gas hydrocarbons within said primary burn chamber or independently heat the primary burn chamber and microprocessor means responsive to a plurality of temperature sensors for operating said burner.

6. A boiler as set forth in claim 1 including a burner coupled to said source of combustion air and fueled by a gas or liquid fuel and mounted to said secondary burn chamber to maintain secondary combustion of hydrocarbons in the exhaust gas within said secondary burn chamber and microprocessor means responsive to a plurality of temperature sensors for operating said burner.

7. A boiler as set forth in claim 1 including an exhaust gas manifold coupled to said primary burn chamber, to said plurality of exhaust gas conduits, and to said exhaust gas port.

8. A boiler as set forth in claim 7 wherein said exhaust gas conduits extend externally at an acute angle from said secondary burn chamber to said exhaust gas manifold.

9. A boiler as set forth in claim 8 wherein the bores of said exhaust gas conduits exhibit a rectilinear cross sectional profile formed to promote turbulent flow of exhaust gases through said exhaust gas conduits.

10. A boiler as set forth in claim 9 wherein said exhaust gas manifold includes a baffle coupled to control the flow of hydrocarbon depleted exhaust gases through said exhaust gas port to the environment.

11. A boiler comprising:
  a) an enclosure having a door and defining a primary burn chamber adapted to receive a combustible biomass fuel and coupled to an exhaust gas port open to the environment;
  b) a plurality of conduits arrayed inside said primary burn chamber and having orifices exposed to the interior of said primary burn chamber;
  c) a secondary burn chamber coupled to receive exhaust gases from said primary burn chamber, wherein said secondary burn chamber comprises an ash collection chamber;
  d) a secondary combustion air conduit coupled intermediate said primary burn chamber and said secondary burn chamber and having a plurality of orifices, wherein said secondary combustion air conduit includes a cavity space opening to said orifices and containing baffles for diverting and delaying airflow through said cavity space to preheat the airflow, and wherein a portion of the cavity space of said secondary combustion air conduit extends into a lower lying ash chamber;
  e) a plurality of tubular exhaust gas conduits coupled intermediate said secondary burn chamber and to said exhaust gas port and having bores formed to produce turbulence in exhaust gases conducted therethrough;
  f) a source of combustion air coupled to said plurality of conduits at said primary burn chamber and to said secondary burner and controlled to 1) direct air through the conduit orifices to pressurize the primary burn chamber and direct combustion exhaust gases containing hydrocarbons past said secondary combustion air conduit and into said secondary burn chamber and 2) direct preheated air from the secondary combustion air conduit orifices to turbulently mix with the passing exhaust gases and induce further combustion of hydrocarbons in the exhaust gases;
  g) a heat exchanger having an enclosure surrounding said primary and secondary burn chambers, said secondary combustion air conduit, and said plurality of exhaust gas conduits and containing a liquid heat exchange media and means for circulating said liquid media through said enclosure; and
  h) means for controlling the flow of exhaust gases through said primary burn chamber, said secondary burn chamber and said exhaust gas conduits to said exhaust gas port.

12. A boiler as set forth in claim 11 wherein a first portion of the conduits in said primary burn chamber are horizontally arrayed about circumferential walls of said primary burner and wherein a second portion of conduits extend vertically parallel to lateral sides of a door opening to produce turbulence in the released exhaust gases and direct the exhaust gases downward to said secondary burn chamber when the door is closed and direct the exhaust gases to said exhaust port when said door is open.

13. A boiler as set forth in claim 12 including a burner coupled to said source of combustion air and fueled by a gas or liquid fuel and mounted to said primary burn chamber to initiate combustion of said biomass fuel and exhaust gas hydrocarbons within said primary burn chamber or independently heat the primary burn chamber and microprocessor means responsive to a plurality of temperature sensors for operating said burner.

14. A boiler as set forth in claim 12 including a burner coupled to said source of combustion air and fueled by a gas or liquid fuel and mounted to said secondary burn chamber to maintain secondary combustion of hydrocarbons in the exhaust gas within said secondary burn chamber and microprocessor means responsive to a plurality of temperature sensors for operating said burner.

15. A boiler as set forth in claim 12 including an exhaust gas manifold coupled to said primary burn chamber, to said plurality of exhaust gas conduits and to said exhaust gas port.

16. A boiler as set forth in claim 15 wherein said exhaust gas conduits extend at an acute angle from said secondary burn chamber to said exhaust gas manifold and wherein the bores of said exhaust gas conduits exhibit a rectilinear cross sectional profile to promote turbulent flow of exhaust gases through said exhaust gas conduits.

17. A boiler comprising:
  a) an enclosure having a door defining a primary burn chamber adapted to receive a wood fuel material and coupled to an exhaust gas port open to the environment;
  b) a plurality of conduits arrayed inside said primary burn chamber and having orifices exposed to the interior of said primary burn chamber, wherein a first portion of the conduits in said primary burn chamber are horizontally arrayed about circumferential walls of said primary burn chamber and wherein a second portion of the conduits extend vertically;
  c) a secondary burn chamber mounted below the primary burn chamber and coupled to receive exhaust gases and ash from said primary burn, chamber;
  d) a secondary combustion air conduit coupled intermediate said primary burn chamber and said secondary burn chamber and having an arcuate surface containing a plurality of orifices mounted opposite a wall of said secondary burn chamber, wherein said secondary combustion air conduit includes a cavity space opening to said orifices and containing baffles for diverting and delaying airflow through said cavity space ;
  e) an exhaust gas manifold coupled to said primary burn chamber and containing said exhaust port and a baffle for directing exhaust gases to said exhaust port;
  f) a plurality of tubular exhaust gas conduits acutely extending between said secondary burn chamber and said exhaust manifold and having bores formed to produce turbulence in exhaust gases conducted therethrough;

g) a source of combustion air coupled to said plurality of conduits at said primary burn chamber and to said secondary combustion air conduit and controlled to 1) direct air through the conduit orifices to positively pressurize the primary burn chamber and direct combustion exhaust gases containing hydrocarbons past said secondary combustion air conduit and into said secondary burn chamber and 2) direct preheated air from the secondary combustion air conduit orifices to turbulently mix with the passing exhaust gases and induce further combustion of hydrocarbons in the exhaust gases;

h) a heat exchanger having an enclosure surrounding said primary and secondary burn chambers, said secondary combustion air conduit, and said plurality of exhaust gas conduits and containing a liquid heat exchange media and means for circulating said liquid media through said enclosure; and i) microprocessor means responsive to a plurality of inputs from temperature sensors monitoring said primary and secondary burn chambers and exhaust gas manifold for controlling the flow of exhaust gases from said primary burn chamber, said secondary burn chamber and exhaust gas conduits and through said exhaust gas manifold and exhaust gas port.

18. A boiler as set forth in claim 17 including a burner coupled to said source of combustion air and fueled by a gas or liquid fuel mounted to said primary burn chamber to initiate combustion of said biomass materials and exhaust gas hydrocarbons within said primary burn chamber or independently heat the primary burn chamber.

19. A boiler as set forth in claim 17 including a burner coupled to said source of combustion air and fueled by a gas or liquid fuel and mounted to said secondary burn chamber to maintain secondary combustion of exhaust gas hydrocarbons within said secondary burn chamber.

* * * * *

UNITED STATES PATENT AND TRADEMARK OFFICE
CERTIFICATE OF CORRECTION

| | | |
|---|---|---|
| PATENT NO. | : 7,954,438 B2 | Page 1 of 1 |
| APPLICATION NO. | : 12/075530 | |
| DATED | : June 7, 2011 | |
| INVENTOR(S) | : Dennis Brazier et al. | |

It is certified that error appears in the above-identified patent and that said Letters Patent is hereby corrected as shown below:

column 10, line 49, after "injected into", "to" should be deleted

Signed and Sealed this
Second Day of August, 2011

David J. Kappos
*Director of the United States Patent and Trademark Office*